United States Patent [19]

Cook et al.

[11] Patent Number: 4,837,730
[45] Date of Patent: Jun. 6, 1989

[54] LINKING SCALAR RESULTS DIRECTLY TO SCALAR OPERATION INPUTS ON A BIDIRECTIONAL DATABUS IN A COMPUTER WHICH SUPERPOSITIONS VECTOR AND SCALAR OPERATIONS

[75] Inventors: Erick M. Cook; Andrew E. Phelps, both of San Diego; Hanan Potash, La Jolla, all of Calif.

[73] Assignee: Scientific Computer Systems Corporation, San Diego, Calif.

[21] Appl. No.: 11,759

[22] Filed: Feb. 6, 1987

[51] Int. Cl.⁴ .................. G06F 13/00; G06F 13/14; G06F 13/38; G06F 13/40
[52] U.S. Cl. .................................. 364/200; 364/730
[58] Field of Search ... 364/200 MS File, 900 MS File, 364/300, 730

[56] References Cited

U.S. PATENT DOCUMENTS

| | | | |
|---|---|---|---|
| 3,984,812 | 10/1976 | Anderson | 364/200 |
| 4,128,880 | 12/1978 | Cray, Jr. | 364/200 |
| 4,636,942 | 1/1987 | Chen et al. | 364/200 |
| 4,661,900 | 4/1987 | Chen et al. | 364/200 |

OTHER PUBLICATIONS

Cray X-MP Series Mainframe Reference Manual HR-0032, Cray Research, Inc. (1982) pp. (1-5), (1-6), (4-2)-to-(4-14).

Primary Examiner—Raulfe B. Zache
Assistant Examiner—Robert B. Harrell
Attorney, Agent, or Firm—Baker, Maxham, Jester & Meador

[57] ABSTRACT

In a computer which superpositions vector and scalar operations and in which operation results and operands are conducted between buffer registers and functional units on a bidirectional databus system, the result of one or more currently-executing scalar operations can be routed directly to the input of one or more functional units, bypassing the buffer registers and saving computer operational time. A scalar result is routed through a linking apparatus which directly connects a bidirectional databus path on which the scalar result is being conducted to a databus path on which a scalar operand is to be conducted. The routing is conditioned upon identity between the scalar result and operand and upon availability of a databus path to support the scalar operation. If the conditions are not met, the scalar result is conducted to the buffer registers, where it is held until needed or until a databus path is available.

7 Claims, 5 Drawing Sheets

FIG. 7 and which includes a buffer unit having

LINKING SCALAR RESULTS DIRECTLY TO SCALAR OPERATION INPUTS ON A BIDIRECTIONAL DATABUS IN A COMPUTER WHICH SUPERPOSITIONS VECTOR AND SCALAR OPERATIONS

CROSS-REFERENCE TO RELATED U.S. PATENT APPLICATIONS

This application is related to the following co-pending U.S. patent applications: U.S. patent application Ser. No. 835,129, now U.S. Pat. No. 4,760,518, filed Feb. 28, 1986, for "BI-DIRECTIONAL DATABUS SYSTEM FOR SUPPORTING SUPERPOSITION OF VECTOR AND SCALAR OPERATIONS IN A COMPUTER" and U.S. patent application Ser. No. 934,406, filed Nov. 24, 1986, for "VECTOR REGISTER CONTROL RESPONSIVE TO VECTOR DATA PATH SELECTION." Both of these related, co-pending patent applications are assigned to the assignee of this patent application and are incorporated herein by reference.

BACKGROUND OF THE INVENTION

This invention is in the field of data transfer in digital computers that perform scalar and vector operations. More specifically, the invention concerns such a computer in which data transfer is conducted on a bidirectional databus that transports vector and scalar data objects between functional units that perform vector and scalar operations and a buffer unit that has scalar and vector registers for temporary storage of scalar and vector data objects being used or produced by the functional units. The invention concerns increasing the efficiency of use of such a databus by linking a scalar data object being produced by a functional unit from a result to an operand data path in the databus upon the condition that the scalar data object is to be immediately used by a functional unit in the performance of an operation.

A particular architecture for a computer which performs scalar and vector operations is disclosed in U.S. Pat. No. 4,128,880 of Cray, Jr. In that architecture, functional units which perform arithmetic and logic operations are connected to respective banks of scalar and vector registers. The register banks are functionally and architecturally located between a computer main memory and the functional units. The registers are provided for the purpose of temporary storage of vector data objects which have been produced as results by the functional units or which are to be used as operands by the functional units. The registers provide immediately addressable storage for data objects. In this regard, a data object is a binary entity comprising one or more elements. A scalar data object is an entity having a single element; a vector data object is an entity having an ordered set of two or more elements. When understood in the context of computer-implemented functions, a data object can be either an operand or a result. Here, an operand is a data object to which a functional operation is applied or which is operated upon by a functional unit, while a result is the data object which is the product of the performance of an operation. Further, scalar data objects may be either scalar operands or scalar results, while vector data objects may be vector operands or vector results.

For efficient vector operations, the technique of vector "chaining" is known. In vector chaining, the concept of single instruction, multiple data streams (SIMD) is implicit. In SIMD machines, instructions are issued one at a time conditioned upon the availability of resources required to execute them. Thus, there is a "single instruction" bottleneck. However, an instruction may be issued before a previously-issued instruction has completed executing, which means that separate data streams are maintained during the execution of each instruction. Vector chaining is based on the realization that the execution of an instruction being issued may depend upon the result of a still-executing, previously-issued instruction. Thus, for example, a vector instruction which adds two operands to produce a result may use, as one operand, the result of a currently-executing instruction.

In vector chaining, a vector operand is read, element-by-element, from a vector register into which a vector result is being concurrently written, also element-by-element. In order to preserve the integrity of the vector data, the control mechanization of the computer disclosed in U.S. Pat. No. 4,128,880 imposes the condition that the vector result be entered into the commonly-used vector register synchronously with, but ahead of, the extraction of the vector operand from the register. This ensures that the vector operand comprises fresh, reliable data.

Thus, vector chaining enhances vector processing operations by permitting concurrent use of a single resource (a vector register) by concurrently-executing instructions: the subsequent instruction can thus issue without waiting for the concurrently-used register to be completely filled and surrendered by the previously-issued instruction.

The efficiency of scalar operations cannot be enhanced by a technique corresponding to vector chaining. Since scalar operations utilize and produce single-element data objects, a scalar operation which is to utilize, as an operand, a result produced by a previously-issued, concurrently-executing scalar instruction must wait until the result is entered into a scalar register. Thus, a scalar instruction whose execution depends upon a scalar result produced by a previously-issued, currently-executing instruction will not be issued until the previous instruction has completed execution. In the context of the control mechanization described by U.S. Pat. No. 4,128,880, the current scalar instruction will be withheld from issue pending surrender of control over the scalar register into which the currently-executing instruction will enter its result.

SUMMARY OF THE INVENTION

Acceleration of a pending scalar instruction requiring, as an operand, the result of a currently-executing instruction is founded upon the inventors' critical observation that provision of a bidirectional pathway between the buffer unit and the functional units will support the reversal of direction of a scalar result so that the result can be returned to the functional units at the same time it is being entered into a scalar register. Thus, the current instruction can be issued upon the condition that the databus is available to return the result as an operand to the functional units.

The invention is found in a computer which performs scalar and vector operations in response to a program instruction sequence and which includes a plurality of functional units, each functional unit producing a result data object in response to one or more operand data objects, and which also includes a buffer unit having scalar registers and vector registers which receive results from the functional units, store the results, and provide stored results as operands to the functional units. The invention improves the performance of the computer and is expressed as an apparatus for conditionally linking a scalar result directly over a databus to a functional unit from a functional unit instead of indirectly through a scalar register. The apparatus includes a bidirectional function databus connected to the buffer unit and to the functional units for transferring data objects between the buffer unit and the functional units during each cycle of a succession of multiphase bus transfer cycles in which operands are transferred from the buffer unit to the functional units during an operand transfer phase of each cycle and in which results are transferred from the functional units to the buffer unit during a result transfer phase of each cycle. The invention further contemplates a scalar linking control mechanism responsive to the program instruction sequence which identifies a buffer unit scalar register that is to receive a scalar result from the functional units during a first bus transfer cycle and which is to provide the scalar result as a scalar operand to the functional units during a second bus transfer cycle following the first bus transfer cycle, wherein the second bus transfer cycle is displaced from the first bus transfer cycle by one or more intervening bus transfer cycles. A scalar linking transfer mechanism connected to the bidirectional function bus and responsive to the scalar linking control mechanism receives the scalar result from the function databus during the result transfer phase of the first bus transfer cycle and provides the scalar result to the function databus during the operand transfer phase of the bus transfer cycle immediately following the first bus transfer cycle.

Viewed from another aspect, the invention is an apparatus for conditionally returning scalar results in a computer controlled by a program sequence of multifield instructions and having functional units which execute multifield instructions by producing scalar and vector results in response to respective sets of scalar and vector operands and a buffer unit, including at least scalar registers which receive scalar and vector results from the functional units, store the results, and provide stored results as scalar operands. This apparatus includes a databus having multiple pairs of data transfer paths connecting the buffer unit and the functional units, each of the data transfer path pairs including a bidirectional data path and a unidirectional data path, the databus transferring operands on both data paths of at least one of the multiple pairs during an operand transfer phase of any cycle of a succession of multiphase bus transfer cycles and transferring the result produced in response to the operands on the bidirectional data path of the pair during a result transfer phase of a cycle following the cycle during which the operands were transferred. The invention further includes a scalar linking control mechanism conditioned by an instruction identifying as the source of a scalar operand, a scalar register which is to receive a scalar result on a respective bidirectional data path during the result phase of a respective transfer cycle and also by availability of one or more of the multiple bidirectional data path pairs to transfer scalar operands for providing scalar linking control signals designating the respective bidirectional data path and a respective available data path of an available one of the multiple bidirectional data path pairs. A scalar linking transfer mechanism connected to the multiple bidirectional data path pairs and responsive to the scalar linking control signal transfers the scalar result from the respective bidirectional data path to the respective available data path during the operand transfer phase of the transfer cycle following the respective transfer cycle during which the scalar result was transferred.

A primary objective of the present invention is to provide an improvement to a computer which performs scalar and vector operations by transferring results and operands between a buffer unit and functional units on a bidirectional data path by conditionally returning scalar results directly to functional units by way of the databus and without first obtaining the results from a scalar register.

A further objective of this invention is to provide such a capability upon the condition that the scalar result to be returned is required as an operand by an instruction scheduled for execution.

A further objective is to effect such a return of a scalar result without preempting use of the databus.

These and other objects and further attendant advantages of this invention will manifest themselves upon a reading of the following detailed description in light of the below-described drawings.

DESCRIPTION OF THE PREFERRED EMBODIMENT

Figure 1:
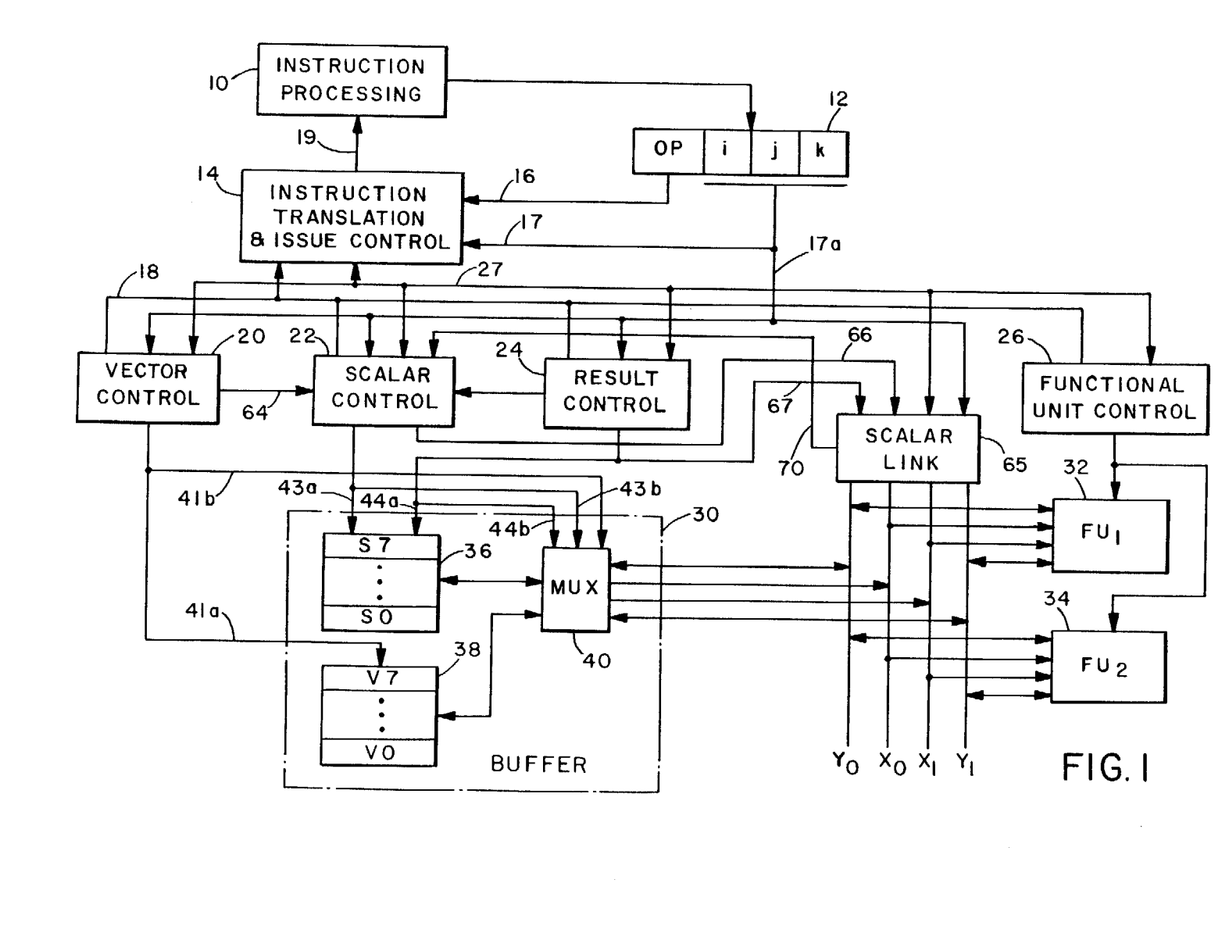
FIG. 1 is a block diagram showing a partial operational environment in which the invention is employed.
Figure 2:
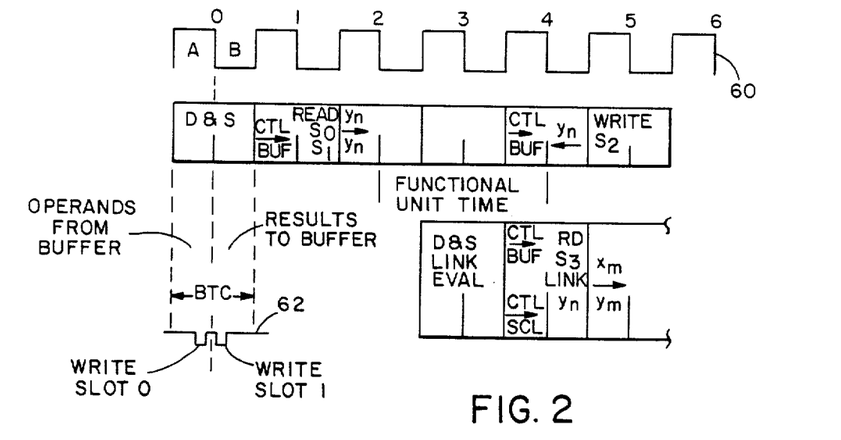
FIG. 2 is a timing diagram illustrating the effect which the operation of the invention has on the issue of instructions.

As background useful for understanding the invention described below, reference is first given to the co-pending related patent applications. With reference now to FIGS. 1 and 2 and to the incorporated patent applications, the operational context of the invention is understood to include a computer which superpositions scalar and vector operations by performing such operations concurrently on a common complement of hardware. Operations are performed to support the execution of instructions which are provided to and executed by the computer in a predetermined program sequence. Thus, the computer includes instruction processing circuitry 10, an instruction register 12, and instruction translation and issue control circuitry (ITIC) 14. The instruction processing circuitry 10 is well-described in incorporated U.S. patent application Ser. No. 835,129. Essentially, the instruction processing circuitry 10 receives an instruction sequence and issues the instructions of the sequence one-by-one under control of ITIC 14. Prior to being issued, an instruction is placed in the instruction register 12 where it remains until issued.

The instruction register 12 is illustrated as having fields designated as OP, i, j, and k. These segments correspond to identically-denoted fields of each instruction. Each instruction has an operation field (OP) and three operand fields designated i, j, and k. The operand fields identify scalar or vector registers which are to be used to obtain the operands and store the result of the operation designated in the OP instruction field. For most scalar instructions, the j and k fields indicate the scalar registers from which the operands are to be obtained, while the i field indicates the scalar register where the result is to be stored. The OP field of the next instruction to be issued is provided to the ITIC 14, where it is decoded into one or more control signals by conventional microsequence circuitry. The ITIC 14 also may use other fields of the instruction in the instruction register 12, as well as control information fed back from control entities in the computer, to determine whether the resources required for execution of the next instruction are available. The ITIC 14 receives the fields of the instruction awaiting issue in the register 12 on the signal lines 16 and 17. In addition, a hold/issue (H/I) signal is provided on signal line 18 to the ITIC 14 whenever one of the control entities determines that resources under its control which are required for execution of the instruction in the register 12 are presently unavailable.

When the instruction in the register 12 issues, the circuit 14 provides a signal on signal line 19 to the instruction processing circuit 10, which causes another instruction to be entered into the register 12 and thereby offered for issue.

The control entities of the computer include a vector control unit (VCU) 20, a scalar control unit (SCU) 22, a result control unit (RCU) 24, and a functional control unit (FCU) unit 26. These control entities are all adequately described in the incorporated U.S. patent applications. Each is allocated control over a respective complement of resources in the computer. The control entities are autonomous and co-operatively implement the sequence of operational steps required to execute issued instructions. The control entities receive decoded control signals on signal line 27 from the ITIC 14 and also receive the i, j, and k fields of the current instruction on signal line branch 17a.

When any one of the control units determines from the control signals and operand field data that resources under its control which are required for execution of the instruction in the register 12 are unavailable, the unit will raise the H/I signal on the signal line 18, thereby preventing issue of the current instruction. The instruction will be held in the register 12 until the resources are available, at which time the H/I signal will be deactivated by the control unit which raised it.

The resources which are overseen by the control units 20, 22, 24, and 26 consist essentially of a buffer unit 30, a bank of segmented functional units, two of which are indicated by 32 and 34, and a bidirectional function databus. The bidirectional function databus includes at least two data transfer path pairs. One pair is indicated by $X_0Y_0$; the other by $X_1Y_1$.

The buffer unit includes a bank of scalar registers 36 and a bank of vector registers 38. There are eight registers in each bank, the scalar registers being designated by $S_0-S_7$ and the vector registers by $V_0-V_7$. In addition, the buffer unit includes a multiplexing crossbar (MUX) 40 which provides the buffer unit registers with crossbar-type access to the function databus. Data is written to or read from the vector registers 38 by using the vector control unit, VCU 20, which provides control signals to the vector registers 38 on signal line 41a and to the MUX 40 on signal line 41b.

Control of the scalar registers 36 is divided between the SCU 22 and the RCU 24, both described in detail in the incorporated U.S. patent application Ser. No. 835,129. For the purposes of shortening this description, it is sufficient to say that the SCU 22 orchestrates the reading of scalar operands from the registers 36 while the RCU 24 is responsible for entering scalar results into the registers 36. Scalar read control signals are provided by the SCU 22 to the scalar registers 36 on signal line 43a and to the MUX 40 on signal line 43b. Write control signals are provided by the RCU 24 to the registers 36 on control line 44a, while steering signals are provided to the MUX 40 on control line 44b.

The functional units 32 and 34 are conventional segmented apparatuses which receive scalar or vector operands from the buffer unit 30 by way of the function databus, perform operations on the operands under control of the FCU 26, and provide results to the buffer unit by way of the function databus.

The function databus is well-described in the incorporated U.S. patent application Ser. No. 835,129. The bus consists of two independently-operating data path pairs, $X_0Y_0$ and $X_1Y_1$. Each of the pairs is identical, consisting of two data paths, with the Y-designated data path being bidirectional, and the X-designated data path being unidirectional. The Y-designated data path of each pair is capable of conducting an operand from the buffer unit 30 to the functional units 32 and 34 and conducting a result from the functional units to the buffer unit 30. The X-designated transfer path conducts only operands from the buffer unit 30 to the functional units. When conducting operands, an XY pair is referred to as an "operand bus." When conducting results, a Y data path is referred to as a "result bus."

As described in detail in the incorporated patent applications, the function databus is not directly controlled by any single control entity. Rather, its use is monitored and scheduled by the control units. Thus, when an instruction is presented for issue, the ITIC 14 provides control signals which notify the control entities of, among other things, the requirement to use a bus. When an entity requires use of the function databus, it will consult with the other control units to determine whether the bus will be available at the time when the control unit needs it. If the bus will not be available, the control unit will raise the H/I signal and keep it activated until it determines that the function databus will be available. When the control unit determines that the function databus will be available, it schedules its use of the function databus by means of a scheduling mechanism that provides the bus scheduling information to the other control units. Function databus scheduling is explained in detail in both of the incorporated patent applications.

When a scalar instruction issues, the SCU 22 causes one or more scalar operands to be read from the registers 36 through the multiplexer 40 onto one of the operand buses $X_0Y_0$ or $X_1Y_1$. At the same time, the RCU 24 schedules the return of the result on one of the result buses $Y_0$ or $Y_1$ at a time which takes into account the execution time of the functional unit performing the operation. The result control scheduling information includes not only the return data transfer path for the result, but also the scalar register into which the result is to be written. The structure and operation of the result control unit in this regard can be understood by reference to the incorporated U. S. patent application Ser. No. 835,129.

Figure 7:
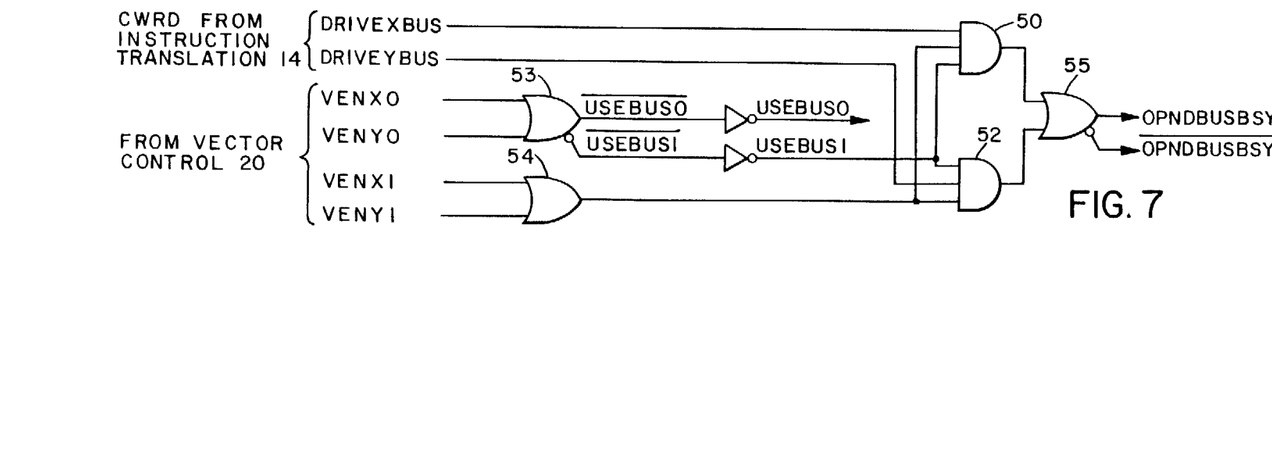
FIG. 7 is a logic circuit diagram which provides bus status information to the link control means for FIG. 3.

When a scalar instruction is in the register 12, the ITIC 14 provides a control word (CWRD) which is responded to by the SCU 22. Reference to FIG. 7 will provide an understanding of how the SCU responds to the control word in developing control signals used by the invention. In FIG. 7, a pair of signals DRIVE X BUS and DRIVE Y BUS are provided to a pair of AND gates 50 and 52. Each is a CWRD control signal indicating that either the X or Y signal path of one of the function bus pairs is required to execute the scalar instruction in the register 12. In addition, four signals VENX0, VENY0, VENX1, and VENY1 are provided from the VCU 20 denoted as line 64 of FIG. 2. These signals indicate use by the VCU 20 of one or more signal paths of each of the function bus pairs in the execution of a previously-issued vector instruction. Thus, for example, if either or both of the function bus pairs $X_0Y_0$ are being used in the execution of a vector instruction, the associated signal will have been placed in an active state by the vector control unit. These enable signals are provided to the OR gates 53 and 54. The OR gate 53 is used to develop two other bus control signals, denoted respectively as $\overline{USEBUS0}$ and $\overline{USEBUS1}$. In this regard, if either, or both, of the transfer paths of the bus pair $X_0Y_0$ are in use, the $\overline{USEBUS0}$ signal will be positive and the $\overline{USEBUS1}$ signal negative. Both signals are inverted to their positive logic senses. The OR gate 54 senses whether function bus pair $X_1Y_1$ is being used for vector transfer. The AND gate 50 will provide a positive output when the current scalar instruction requires use of an X transfer path and both function bus pairs are being used for vector data transfer. Similarly, the AND gate 52 provides a positive output when the scalar instruction requires use of Y transfer path and both function bus pairs are utilized. The outputs of the AND gates 50 and 52 are collected by the OR gate 55 to provide a signal OPNDBUSBSY indicating that neither of the function bus pairs is available to conduct a scalar operand.

Operation of the structure of FIG. 1 in the execution of a scalar instruction can be understood with reference to FIG. 2. In FIG. 2, a bus transfer clock (BCLK) waveform 60 consists of a sequence of seven bus transfer cycles (BTC) 0-6. Each bus transfer cycle consists of two phases, illustrated in the first cycle as phase A and phase B. During phase A of each cycle, operands are transferred from the buffer unit 30 by way of one of the operand buses to the functional units. During the second phase, phase B, of each cycle, results are transferred on a result bus from the functional units to the buffer unit. In keeping with the structure described above, a pair of scalar operands, each consisting of a single data element, are transferred via one of the operand buses to a designated functional unit 32 and 34. On the second phase of the cycle, a result can be transferred on each of the result buses of the function databus.

The operational sequence for a scalar instruction, such as a scalar add, is also illustrated in FIG. 2, where the sequence for a scalar instruction 0 spans bus transfer cycles 0-5. During the transfer cycle 0, the instruction is in register 12, where it is decoded and scoreboarded (D and S). Here decoding refers to instruction translation performed by the ITIC 14, while scoreboarding refers to the scheduling of resources by the affected control entities. For a scalar instruction, the SCU schedules the buffer and function databus resources for transferring one or more operands from the buffer unit onto a designated operand bus, the FCU 26 schedules the functional unit required to perform the scalar operation, and the RCU 24 schedules a Y data transfer path and buffer unit resources for entry of the result into a scalar register. During bus transfer cycle 1, control is provided to the buffer unit (CTL→BUF) from the SCU 22 for reading one or more scalar operands from the registers 36 through the multiplexer 40 onto the designated operand bus. The scalar registers providing the operands, designated as $S_0$ and $S_1$, are read during the second phase of the bus transfer cycle 1, and the two scalar operands $x_n$ and $y_n$ are placed on the designated operand bus during the operand phase of the bus transfer cycle 2. The time required for the designated functional unit 32 or 34 begins with the result phase of the bus transfer cycle 2, at which time the scalar operands are captured from the designated operand bus by the designated functional unit 32 or 34. The functional unit time spans three transfer cycles; therefore, the result produced by the functional unit is placed on the designated result bus during the result transfer phase of the bus transfer cycle 4. Immediately preceding the placement of the result, control signals are provided to the buffer unit (CTL→BUF) by the RCU 24 to configure the multiplexer 40 and a designated scalar register in preparation for writing the result into the designated scalar register (register $S_2$ for the purpose of this example). The phasing between the RCU 24 and the buffer unit 30 is such that the result, $y_n$, is actually entered into scalar register $S_2$ during the operand phase of the bus transfer cycle 5.

As disclosed in incorporated U.S. patent application Ser. No. 835,129, the RCU 24 is designed to write two scalar results during each bus transfer cycle. This capability is provided in anticipation of two scalar results being returned to the buffer unit simultaneously during the result phase of any BTC. As shown in BTC 0 of FIG. 2, one result can be entered during the first phase of the bus transfer cycle (write slot 0), while the second result can be written immediately after the beginning of the second phase (write slot 1).

In order to understand the operation of the invention, assume that a second scalar instruction, scalar instruction 1, is available in the instruction register 12 during BTC 3, the fourth cycle in the execution sequence of scalar instruction 0. Assume further that one of the operands of scalar instruction 1 is to be found in scalar register $S_2$, the register into which the result of scalar instruction 0 is to be written. During the decode and scoreboard cycle of scalar instruction 1, the SCU 22 determines, from the scoreboard information held by the RCU 24, that scalar register $S_2$ has been scheduled for entry of result $y_n$. As explained in the incorporated U.S. patent application Ser. No. 835,129, the SCU 22 will activate the hold issue signal, preventing issue of scalar instruction 1 until entry of the result into the register $S_2$. This would result in delaying commencement of the second cycle of scalar instruction one until BTC 5. However, the operation of the scalar linking unit 65 can advance the issue of scalar instruction 1 by one bus transfer cycle upon the condition that a data transfer path is available during the operand phase of bus transfer cycle 5. If this condition is met, scalar instruction 1 is issued and its instruction execution sequence commences during the fifth cycle of scalar instruction 0's sequence (BTC 4). Thus, during the second cycle of the scalar instruction 1 execution sequence, control is provided by the SCU 22 to the buffer board for reading the scalar register containing one operand (scalar register $S_3$ in the example), while internal controls are generated by the scalar linking unit 65 (CTL→SCL) to set up the required link of function databus transfer paths during the operand phase of cycle 1 of scalar instruction 1. Then, during the result phase of BTC 4, an operand is read from register $S_3$, while the result $y_n$ is linked to the available data path. Then, in BTC 5 the two operands denoted as $x_m$ and $y_m$ are conducted on the designated operand bus to a designated functional unit. It should be noted that, while the result $y_n$ is being linked to a data path for transfer as an operand, it is also being written into the register $S_2$, in order to preserve the integrity of data in the registers 36.

Thus, it can be seen that operation of the scalar linking apparatus 65 permits the execution sequence of scalar instruction 1 to be advanced by one bus transfer cycle, thereby speeding up the scalar operations of the processing architecture illustrated in FIG. 1 and described in detail in the incorporated U.S. patent applications.

Returning to FIG. 1, the interconnection of the scalar linking apparatus 65 with the above-described processing system includes reception of control signals from the SCU 22 and the result control unit 24 on signal lines 66 and 67, respectively, as well as receipt of a portion of the control word (CWRD) as translated by the ITIC 14 on signal line 27. The scalar linking apparatus 65 also receives, on signal line 17a, the operand and result fields of the current instruction. In order to perform its linking function, the scalar linking apparatus 65 is also connected to each data transfer path of the functional databus. Finally, the scalar linking apparatus 65 provides a linking validity signal to the SCU 22 on signal path 70, which prevents the SCU from activating the hold issue signal when linking conditions are met.

Figure 3:
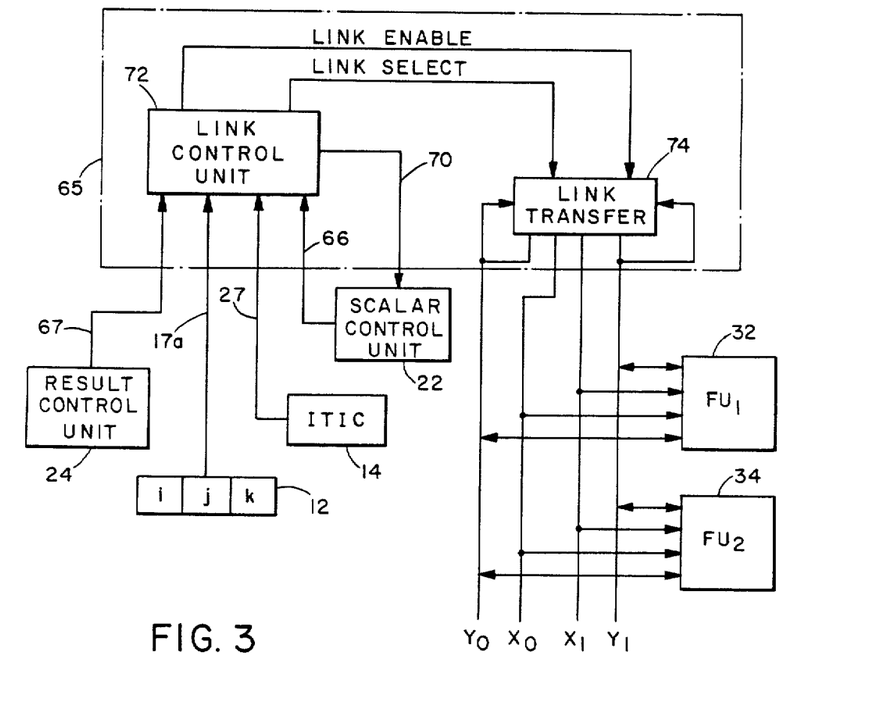
FIG. 3 is a conceptual block diagram illustrating the interconnection of the three primary functional blocks of the invention.

FIG. 3 illustrates the primary functional components of the scalar linking apparatus 65, and shows in greater detail how those components are interconnected with each other and with the processing circuitry of FIG. 1.

In FIG. 3, the scalar linking apparatus consists of a link control unit 72 which receives result scoreboarding information from the result control unit 24, the i, j, and k fields from the instruction in the register 12, a portion of the control word from the ITIC 14, and functional databus availability information, described above with reference to FIG. 7, from the SCU 22. These inputs permit the link control unit 72 to determine whether an operand source designated by the i, j, or k field of a scalar instruction offered for issue matches a scalar register into which a scalar result is to be written in two cycle's time. This is shown in FIG. 2, where the D and S cycle of scalar instruction 1 occurs during the fourth cycle of scalar instruction 0 (BTC 3). The second condition determined by the link control component 72 is whether a data transfer path will be available to return the result during the operand phase of the second cycle following the cycle during which the scalar instruction was offered for issue. Thus, in FIG. 2, if an operand bus is not available during the sixth cycle of scalar instruction 0 (BTC 5), the D and S period of scalar instruction 1 will be extended until an operand bus is available. If scalar instruction 1 is not issued during the fourth cycle of scalar instruction 0 (BTC 3), scalar instruction 1 will execute in the same manner as scalar instruction 0, that is, by reading the scalar operands from their respective scalar registers designated by the instruction in the register 12.

The two prerequisites for scalar linking, that is, that a scalar register scheduled for receiving a result be identical to an operand register designated by the currently-offered scalar instruction (referred to hereinbelow as a "scalar register match") and that an operand bus path is available (bus availability) for transferring the result required as an operand by the currently-offered scalar instruction, are referred to hereinafter as "linking conditions." If both linking conditions are met, the link control component 72 of FIG. 3 provides LINK ENABLE and LINK SELECT signals to a link transfer unit 74, which effects the linkage.

The link transfer unit effects a synchronized connectivity between either of the result buses $Y_0$ or $Y_1$ during the result transfer phase of a bus transfer cycle and one data transfer path of an available operand bus during the operand transfer phase of the immediately following bus transfer cycle. Thus, for example, a scalar data object on $Y_1$ during the result phase of bus transfer cycle $n$ can be routed onto $Y_0$, $X_0$, $X_1$, or $Y_1$ during the operand transfer phase of bus transfer cycle $n+1$.

Figure 4:
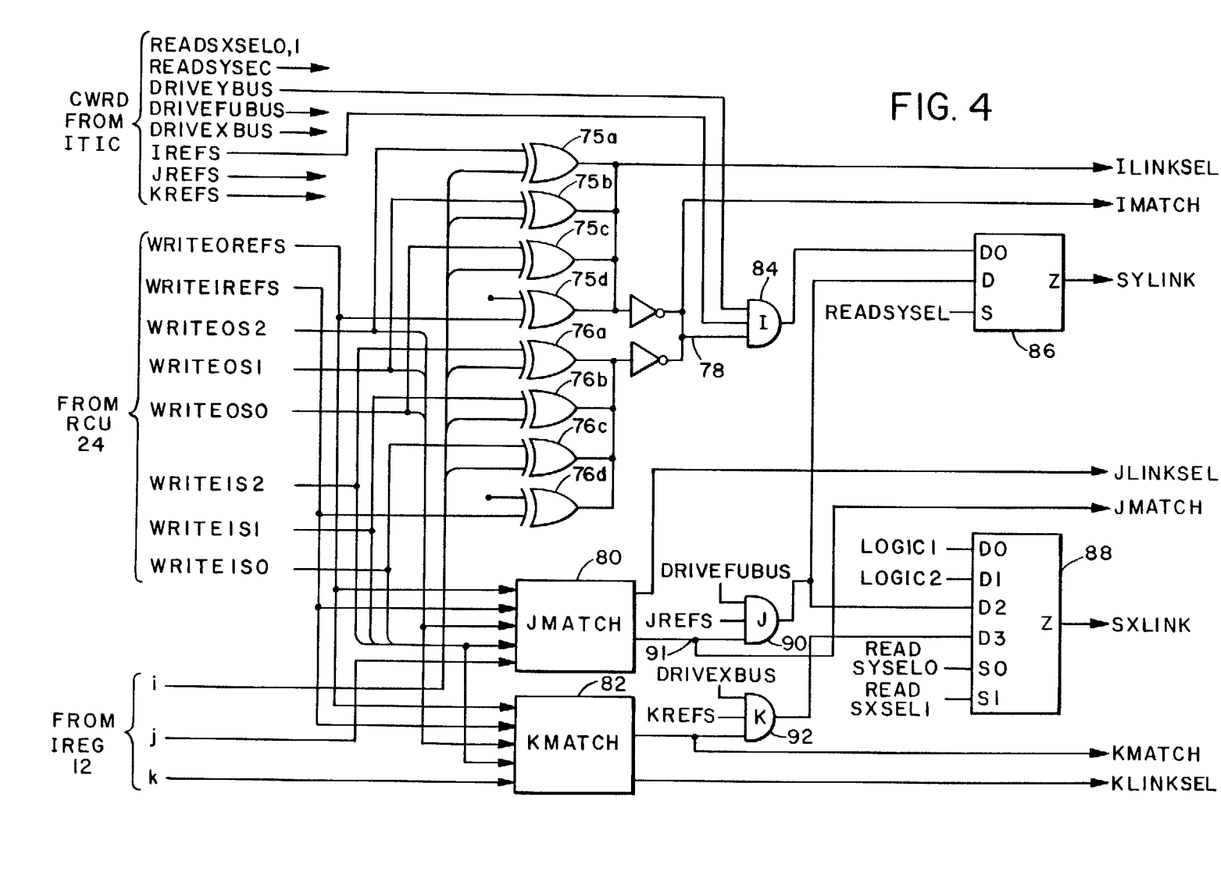
FIGS. 4 and 5 are logic circuit diagrams illustrating the structure and operation of the link control means of FIG. 3.
Figure 5:
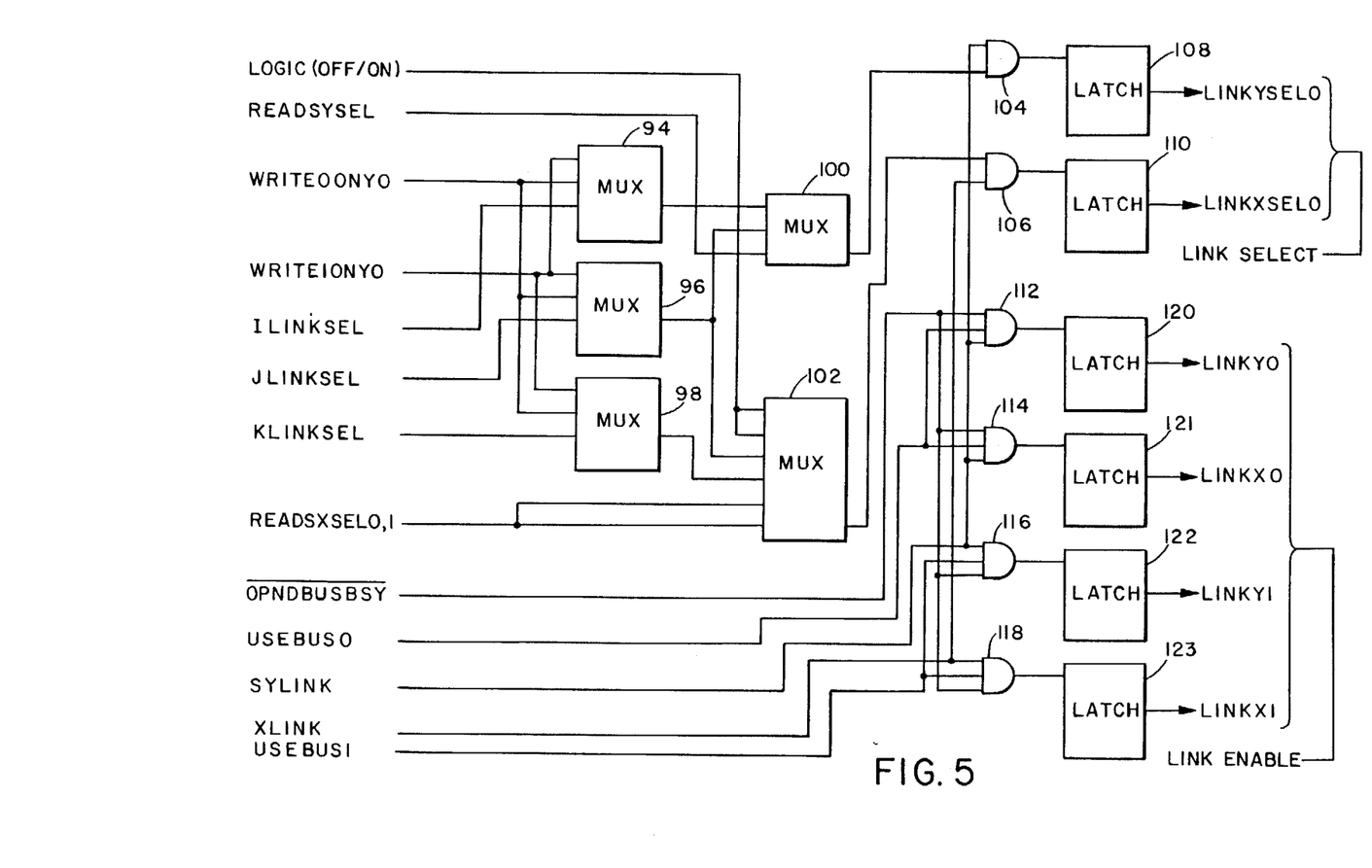

The link control unit 72 can be understood by reference to FIGS. 4 and 5 and to incorporated U.S. patent application Ser. No. 835,129. Scheduling information from the RCU 24 regards the identification of a scalar register which is to receive a result on the function databus. In this respect, the signals WRITE0REFS and WRITE1REFS indicate whether a result is to be written during write slot 0 or write slot 1 of the next bus transfer cycle, while the three signals WRITE0S2, WRITE0S1, and WRITE0S0 form the binary code of the scalar register which is to receive a result during write slot 0 of the next bus transfer cycle. Similarly, the three signals WRITE1S2, WRITE1S1, and WRITE1S0 are a binary code indicating the scalar register to receive a result during write slot 1 of the following bus transfer cycle. Binary codes corresponding to the register designations in the i, j, and k field in the instruction register (IREG) 12 are also received. Determination of a scalar register match can be understood with reference to I match logic comprising a first set of exclusive OR (XOR) gates 75a–75d and a second set of XOR gates 76a–76d. The gates 75a–75d compare the designation of a scalar register slated for receipt of a result during write slot 0 of the next bus transfer cycle with the scalar register designated in the i field of the register 12. The same comparison is made for writ slot 1 of the next bus transfer cycle by the XOR gates 76a–76d. As shown, all of the outputs of the XOR gates 75a are dot OR'd together and inverted, as are the outputs of the OR gates 76a–76d. Thus, if there is a match between the scalar register designated in the i field of register 12 and a scalar register which is to receive a result during either write slot of the following bus transfer cycle, the logic level at the dot OR node 78 will become positive. A positive logic level at the dot OR node 78 is taken as the active state of a signal IMATCH, which indicates that the i field-designated scalar register matches a scalar register designated as a result destination on the following bus transfer cycle. The dot OR product of the XOR gates 75a–75d, ILINKSEL, indicates during which write slot the match occurs. Corresponding signal pairs, JMATCH/JLINKSEL and KMATCH/KLINKSEL, are produced by logic circuits 80 and 82 which correspond essentially to the I match logic just described. Thus, JMATCH indicates that the j field-designated register matches a scalar register scheduled for receipt of a scalar result and JLINKSEL informs during which write slot of the following bus transfer cycle the match occurs.

The dot OR product at the node 78 is fed to an AND gate 84 which also receives control word signals from the ITIC 14. The control word (CWRD) signals from the ITIC 14 are used to indicate to gating logic such as is in FIGS. 4 and 5 which of the operand buses are to be driven (DRIVEYBUS, DRIVEXBUS, and DRIVEFUBUS), which OP field scalar register is to be read onto the activated function unit databus transfer paths (READSXSEL0,1 and READSYSEL), and which OP fields are used to designate scalar operand sources (IREFS, JREFS, and KREFS). Thus, if two operands are to be provided on an operand bus, the DRIVEYBUS and DRIVEXBUS signals will be activated. The DRIVEFUBUS signal is derived by logically OR-ing these two signals, and thus will be active whenever either DRIVEYBUS or DRIVEXBUS is active. Only scalar registers designated in the i and j field registers provide operands on the Y data transfer path of the available operand bus, with the condition of READSYSEL indicating which register is to be used. In the preferred embodiment, the X data path of an operand bus is used for transfer of data elements in addition to scalar operands, with the data source of the transfer path being indicated by one of four states assumed by the two signals READSXSEL0,1. One of those four states indicates that the scalar register identified in the j field of the instruction is used, while another state indicates use of the k-designated register.

Thus, for example, if scalar operands are to be provided from the j- and k-designated scalar registers, the DRIVEFUBUS and DRIVEXBUS signals will be active, READSYSEL will indicate that the j register is to feed the Y data path, while READSXSEL0,1 will indicate that the k-designated register is to drive the X transfer path of the available operand bus. The JREFS and KREFS signals will both be active, indicating that the corresponding operand fields of the instruction contain the operand source designations. In this case, the output of the AND gate 90 will depend upon the state of the dot OR operation at the node 91. If the j field of the instruction in the register 12 is identical with a result register in either write slot 0 or write slot 1 of the next bus transfer cycle, the output of the AND gate 90 will be logically positive. The output of this gate is fed to one of two data input ports of a multiplexer 86. The multiplexer 86 operates conventionally in that its output at port Z will be selected from one of the two input ports according to the state of the signal at the select port S. The select signal comprises the READSYSEL signal, which in the postulated example will indicate that the Y data path is to be driven by the j-designated register. This state causes the multiplexer to pass the output of the AND gate 84 through the output port Z. Thus, if there is a register match, the signal SYLINK output by the multiplexer 86 will be positive, indicating that the Y data path of the operand bus selected for transmission of the operands can be linked to the result bus on which the result will be conducted. The SYLINK signal, together with the JMATCH and the JLINKSEL signals, establish the first linkability condition, that is, register match. It will be evident to those skilled in the art upon inspection of the operation of gate 92 and the operations of the multiplexer 88, that match of a designated register with a register scheduled for receiving results will produce signals indicating which data transfer path of a selected pair is to be linked to the data transfer path transferring the result, which register has been matched, and the write slot during which the match will occur.

In FIG. 5, the signals from the portion of the link control component illustrated in FIG. 4 and scalar control unit bus control signals provided by the circuitry of FIG. 7 are combined with control signals from the RCU 24, indicating which of the result buses the result to be linked is on, to produce the LINK ENABLE and LINK SELECT signals that control the link transfer unit 74.

In FIG. 5, two additional signals WRITE0ONY0 and WRITE1ONY0 are received from the RCU 24. These signals are included in the cluster of scheduling information necessary to write a result from one of the result buses into a scalar register. Each designates whether the result to be written is in a respective write slot on the $Y_0$ result bus. Implicitly, therefore, each indicates, for a respective time slot, whether the result to be linked is on result bus $Y_0$ or $Y_1$. For example, if the register match linkability condition exists and is indicated by a set of three signals from the circuitry of FIG. 4, it is known that a result, available only on result bus $Y_0$ or $Y_1$, will be linked, with the write slot indicated by the respective LINKSEL signal received from the FIG. 4 circuitry. Therefore, each of the three multiplexers 94, 96, and 98 receives both of the WRITE signals as inputs, with the selection of the signal being determined by the respective LINKSEL signal setting the multiplexer's selection configuration. For example, if j-designated register linkage has been established, the multiplexer 96 will select the particular WRITE signal according to the condition of the ILINKSEL signal, which indicates within which write slot linkage is to occur. In this case, the output of the multiplexer 94 will correctly identify the result bus on which the result to be linked will be found. The multiplexers 94 and 98 operate, as does the multiplexer 94, when either the i or k-designated register matches a register scheduled to receive the result on the next bus transfer cycle. The multiplexers 100 and 102 operate to channel the selected result bus which will conduct the linkable scalar result to link either with the X or Y data path of an operand bus for transfer of the linked result as a scalar operand. In this regard, recall that the READSYSEL and READSXSEL0,1 signals indicate to which operand bus data path a matched register is to provide a scalar operand. Thus, for example, if the READSYSEL signal indicates that the i-designated register is to supply an operand, the multiplexer 100 will connect the output of the multiplexer 94 to its own output. On the other hand, if the j-designated register is to provide an operand to the Y data path of the selected operand bus, the output of the multiplexer 100 will reflect the output of the multiplexer 96. Similarly, the READSXSEL0,1 signal determines whether the output of the multiplexer 96 or the multiplexer 98 will be connected to the output of the multiplexer 102.

The AND gates 104 and 106 receive the outputs of the multiplexers 100 and 102, respectively. Each of these AND gates is controlled by a respective one of the LINK signals, (SXLINK or SYLINK), produced by the circuitry of FIG. 4. Recall that, if linking is to occur, one or both of these signals will have a positive state indicating which data path of the selected operand bus is to conduct a linked scalar data object. Thus, if the matched register is designated by the i field (indicated by SYLINK asserted) linkage will result in connection of the scalar result from one of the two result buses to the Y data path of the selected operand bus. Therefore, if linkage is to occur, the output of the AND gate will indicate which of the result buses contains the data to be linked, and this information will be reflected by the output of latch 108 and the signal LINKYSEL0. Similarly, a matched k-designated register will result in the transfer of the result bus status from multiplexer 102 through AND gate 106 to the LINKXSEL0 signal. It should be evident that a matched j-field register can result in the activation of either LINKYSEL0 or LINKXSEL0.

The operand bus data path to which a scalar result is to be linked is selected by logic gates 112, 114, 116, and 118. As stated above, the operand bus designated for use by the instruction in the register 12 is indicated by the states of $\overline{\text{OPNDBUSBSY}}$, USEBUS0, and USEBUS1. Further, the SYLINK and SXLINK signals indicate which data path of the selected operand bus is to receive the linked result. These five signals are combined conventionally by the AND gates 112, 114, 116, and 118 to develop four signals: LINKY0, LINKX0, LINKY1, and LINKX1. For example, assume that operand bus 0 is in use and that operand bus 1 is available. In this case, $\overline{\text{OPNDBUSBSY}}$ will be inactive, USEBUS0 will be inactive, and USEBUS1 will be active. Assume further that SYLINK is active, corresponding to selection of the Y data path of operand bus 1 for receipt of the linked result. This will result in the output of AND gate 116 rising to a positive logic level. This positive logic level is passed through the latch 122 as a signal LINKY1, indicating that operand transfer path $Y_1$ is to receive a linked result for transmission to the functional units.

Figure 6:
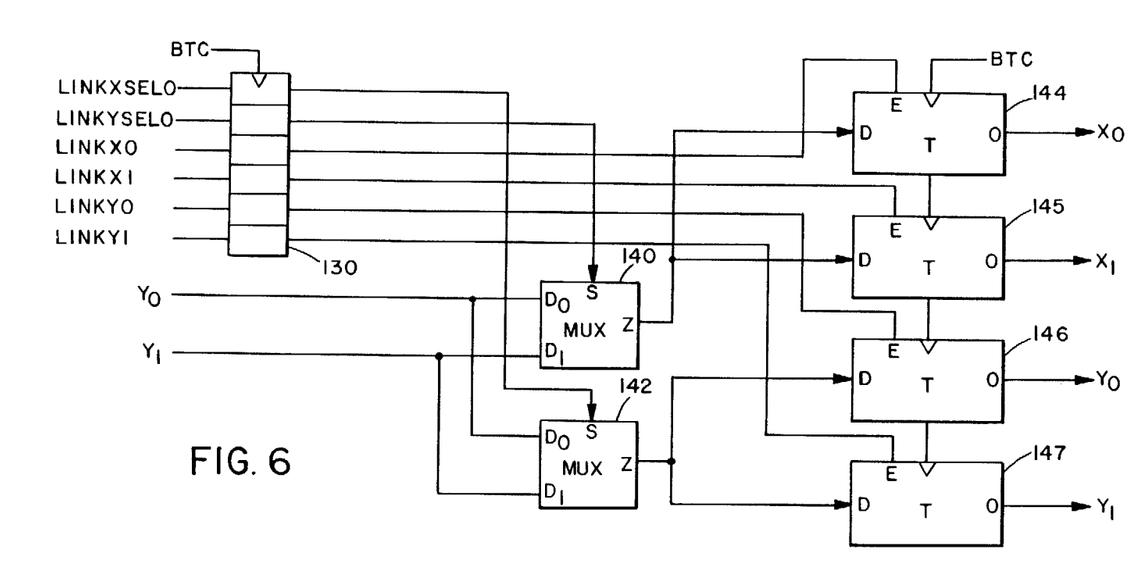
FIG. 6 is a logic circuit diagram illustrating the link transfer means of FIG. 3.

Actual linkage is effected by the link transfer unit 74, which is illustrated in detail in FIG. 6. The condition of the link select signal LINKXSEL0 and LINKYSEL0 determine the conductivity of the multiplexers 140 and 142. It will be evident that each of the multiplexers 140 and 142 has a default connectivity, depending upon the default condition of its respective select control signal. The link enable signals LINKY0–LINKX1 provided by the latches 120–123, of FIG. 5, comprise the respective enabling signals for the three-state, clocked transceivers 144–147. In this regard, each transceiver, when enabled, latches the signal present at its input port D and connects the latched signal to its output port O on the first positive-going transition of the bus transfer clock 60, of FIG. 7, following the activation of its respective enabling signal.

For example, assume that the linkability conditions are satisfied and that a result on result bus $Y_0$ is to be transferred to the $Y_0$ transfer path of the operand bus $X_0Y_0$. In this case, either the j- or k-designated register has been matched and a result destined for the matched register and available on result bus $Y_0$ will be fed back to the functional units on the $Y_0$ transfer path of the $X_0Y_0$ operand bus on the bus transfer cycle immediately following the cycle during which the result is on the result bus $Y_0$. In this case, refer to FIG. 2 for an understanding of the timing of the circuits illustrated in FIGS. 4, 5, and 6. Assume that scalar instruction 0 is being executed and that scalar instruction 1 is in the instruction register 12 during bus transfer cycle 3 of the fragment 60 of BCLK. During bus transfer cycle 3, the functional unit performing the scalar operation required by instruction 1 is engaged in operation and scalar instruction 1 is in the instruction register 12. The OP code of scalar instruction 1 is decoded by the ITIC 14 and the resulting control word is provided on signal line 27 to all of the control units. Assume that scalar instruction 1 involves transfer of scalar operands from the j- and k-designated registers, and that the j-designated register has been scheduled for receipt of the result of scalar instruction 0. At this point, without the scalar linking apparatus 65, the scalar control unit 22 would hold issue of scalar instruction 1 in order to await placement of the result of scalar instruction 0 in the j-designated register. However, during the D&S cycle of scalar instruction 1, linkability is evaluated by the component of the scalar linking apparatus illustrated in FIGS. 4 and 5. In this case, the JMATCH logic circuit 80 of FIG. 4 will determine that the j-designated register is matched. This circuitry will then activate the JMATCH signal and provide the correct sense of the JLINKSEL signal to indicate the write slot in which the match occurs. Since the scalar instruction 1 j-field designates a scalar operand source, the JREFS signal will be activated. Since j-designated register operands are transferred on Y operand bus data paths when the instruction indicates operands are to be obtained from j- and k-designated registers, the DRIVEYBUS signal will also be active. The output of the AND gate 90 will rise. Since scalar instruction 1 is of a class that provides j-field designated operands, the READSYSEL signal will cause the multiplexer 86 to provide, as the SYLINK signal the active output of the AND gate 90. Turning now to FIG. 5 and understanding that the D&S phase of scalar instruction 1 has not yet ended, the state of the JLINKSEL signal will cause the multiplexer 96 to select the WRITE signal that correctly identifies $Y_0$ as the result bus which is to provide a linked scalar result. The state of the READSYSEL signal will cause the multiplexer 100 to provide the identification of result bus $Y_0$ to the AND gate 104. The SYLINK signal will permit the AND gate 104 to place the LINKYSEL0 signal in the state corresponding to selection of result bus $Y_0$ by the combination of multiplexers 96 and 100. As the result, the multiplexer 142 in FIG. 6 will assume a configuration which connects result bus $Y_0$ to the D input ports of the bus transceivers 146 and 147. Assuming that an operand bus is available, the signals $\overline{\text{OPNDBUSBSY}}$, USEBUS0, and USEBUS1 will permit the SYLINK signal to be provided through either AND gate 112 or 116, thereby to determine the state of the LINKY0 or LINKY1 link enable signals, depending upon which operand bus is to be used. As shown in FIG. 6, the link select and link enable signals are registered in the link transfer unit register 130 at the beginning of the operand phase of transfer cycle 4. Following the scenario described above, the LINKYSEL0 signal will configure the multiplexer 142 for a connection of result bus $Y_0$ to the bus transceivers 146 and 147. Then, both bus transceivers will capture the scalar result on result bus $Y_0$ during the result phase of transfer cycle 4, and at the beginning of transfer cycle 5, depending upon the enables LINKY0 and LINKY1, the linked result will be made available from the appropriate one of the transceivers 146 or 147 to the Y data path of the operand bus being used for the execution of scalar instruction 1.

Obviously, many modifications and variations of the above-described invention are possible in light of these teachings. Therefore, it is to be understood that within the scope of the disclosed invention, it may be practiced other than as specifically described.

We claim:

1. A computer which performs scalar and vector operations in response to a program instruction sequence and which includes a plurality of functional units, each for producing a result data object in response to two or more operand data objects, and which also includes a buffer unit having scalar registers and vector registers which receive result data objects from said functional units, store said received data objects, and provide stored data objects as operand data objects to said functional units, in which the improvement comprises:

an apparatus for conditionally bypassing storage of a scalar data object in said buffer unit scalar registers prior to providing the data object as a result by directly linking a result data object to a functional unit, said apparatus including:

a bidirectional function bus connected to said buffer unit and to said functional units for transferring scalar and vector data objects between said buffer unit and said functional units during each cycle of a succession of multiphase bus transfer cycles, in which scalar operands are transferred form said buffer unit scalar registers to said functional units during an operand transfer phase of each bus transfer cycle and in which scalar results are transferred from said functional units to said buffer unit scalar registers during a result transfer phase of each bus transfer cycle;

link control means responsive to said program instruction sequence for identifying a buffer unit scalar register which is to receive a scalar result from said functional units during a first bus transfer cycle and which is to provide said scalar result as a scalar operand to said functional units during a second bus transfer cycle following said first bus transfer cycle, said second bus transfer cycle being displaced from said first bus transfer cycle by one or more bus transfer cycles; and link transfer means connected to said bidirectional function bus and responsive to said link control means for receiving said scalar result form said bidirectional function bus during the result transfer phase of said first bus transfer cycle, while said scalar result is being transferred on said bidirectional function bus to said buffer unit scalar register, and for providing said scalar result to said bidirectional function bus during the operand transfer phase of the bus transfer cycle immediately following said first bus transfer cycle.

2. The improvement of claim 1, wherein:

said bidirectional function bus includes at least one pair of data transfer paths in which a first data transfer path is bidirectional and transfers both result and operand data objects and in which a second data transfer path is uni-directional and transfers only operand data objects;

said link control means is further for determining whether a pair of data transfer paths is available to transfer said scalar result during the bus transfer cycle immediately following said bus transfer cycle and for designating an available pair of transfer paths; and said link transfer means is further responsive to said link control means for providing said scalar result to said available pair of data transfer paths.

3. The improvement of claim 2, wherein:

said link control means is further for determining which data transfer path of said available pair of data transfer paths is available for transfer said scalar result and for designating an available data transfer path; and said link transfer means is further responsive to said link control means for providing said scalar result to said available data transfer path.

4. The improvement of claim 2, wherein:

said link control means is further for determining on which bidirectional data transfer path of said bidirectional data function bus said scalar result is being provided and for designating an available bidirectional data transfer path; and said link transfer means is further responsive to said link control means for transferring said scalar result from said available bidirectional data transfer path to said available pair of data transfer paths.

5. The improvement of claim 4, wherein:

said link control means is further for determining which data transfer path of said available pair of data transfer paths is available to transfer said scalar result and for designating an available data transfer path of said available pair of data transfer paths; and said link transfer means is further responsive to said link control means for transferring said scalar result from said available bidirectional data transfer path to said available data transfer path.

6. An apparatus for conditionally returning unstored scalar results in a computer controlled by a programmed sequence of multifield instructions and having functional units which execute multifield instructions by producing scalar and vector results in response to respective sets of scalar and vector operands and a buffer unit, including at least scalar registers, which receives scalar and vector results from said functional units, stores said results, and provides stored results as scalar and vector operands, said apparatus including:

databus means including multiple pairs of data transfer paths connecting said buffer unit and said functional units, each said multiple pairs of data transfer paths including a bidirectional data path and a unidirectional data path, said databus means for transferring operands on both data paths of at least one of said multiple pairs of data transfer paths during an operand transfer phase of a cycle of a succession of multiphase bus transfer cycles and for transferring a scalar result produced in response to said operands on the bidirectional data path of one of said multiple pairs of data transfer paths during a result transfer phase of a cycle following said cycle during which said operands were transferred;

scalar linking control means conditioned by an instruction identifying a scalar register which is to receive a scalar result on a respective bidirectional data path during a result phase of a respective transfer cycle as a source of a scalar operand and by availability of one or more of said multiple pairs of data transfer paths to transfer scalar operands for providing scalar linking control signals designating said respective bidirectional data path and a respective available data path of an available one of said multiple pairs of data transfer paths; and scalar linking transfer means connected to said multiple pairs of data transfer paths and responsive to said scalar linking control signals for transferring said scalar result from said respective bidirectional data path to said respective available data path during the operand transfer phase of the next transfer cycle following said respective cycle, while said scalar result is being received by said scalar register.

7. In a computer which superpositions vector and scalar operations in response to a sequence of instructions and which includes a data path for conducting vector operands and results and scalar operands and results between a set of registers, including scalar registers for storing scalar data objects, and a plurality of functional units, said computer including machine control means for reading scalar operands from said scalar registers for provision to said functional units after first entering scalar results into said scalar registers, an improvement for providing scalar results to said functional units without first entering them into said scalar registers, the improvement comprising:

a bidirectional databus interconnecting said set of registers with said functional units, said databus including at least one pair of data paths, at least one of said data paths being a bidirectional conductor;

register comparing means responsive to said instruction sequence for detecting identity between a scalar register which is to receive a scalar result on a bidirectional data conductor of said databus in response to a first instruction in said sequence and a scalar register which is to provide said scalar result as a scalar operand on a data path of said data in response to a second instruction following said first instruction in said sequence;

data path link use means responsive to said second instruction and to said register comparison means for detecting an idle pair of data paths for transferring a pair of scalar operands which includes said scalar operand to a functional unit during execution of said second instruction; and data path linkage means connected to all of the data paths of said databus and responsive to said data path link use means for providing said scalar result to said functional unit by directly connecting said bidirectional data conductor to one data path of said idle pair of data paths.

* * * * *